US012658435B2

(12) United States Patent
Kim et al.

(10) Patent No.: US 12,658,435 B2
(45) Date of Patent: Jun. 16, 2026

(54) METHOD OF PREPARING POSITIVE ELECTRODE ACTIVE MATERIAL PRECURSOR FOR LITHIUM SECONDARY BATTERY, POSITIVE ELECTRODE ACTIVE MATERIAL PRECURSOR, AND POSITIVE ELECTRODE ACTIVE MATERIAL, POSITIVE ELECTRODE, AND LITHIUM SECONDARY BATTERY WHICH ARE PREPARED BY USING THE PRECURSOR

(71) Applicant: LG Chem, Ltd., Seoul (KR)

(72) Inventors: Hyun Uk Kim, Daejeon (KR); Eung Ju Lee, Daejeon (KR); Woo Hyun Kim, Daejeon (KR); Sang Soon Choi, Daejeon (KR); Jun Gil Kim, Daejeon (KR); Gyeong Il Yoo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 862 days.

(21) Appl. No.: 17/779,244

(22) PCT Filed: Mar. 22, 2021

(86) PCT No.: PCT/KR2021/003526
§ 371 (c)(1),
(2) Date: May 24, 2022

(87) PCT Pub. No.: WO2021/187963
PCT Pub. Date: Sep. 23, 2021

(65) Prior Publication Data
US 2022/0407063 A1 Dec. 22, 2022

(30) Foreign Application Priority Data
Mar. 20, 2020 (KR) ........................ 10-2020-0034381

(51) Int. Cl.
*H01M 4/525* (2010.01)
*C01G 53/44* (2025.01)
(Continued)

(52) U.S. Cl.
CPC ............ *H01M 4/525* (2013.01); *C01G 53/44* (2013.01); *H01M 4/505* (2013.01);
(Continued)

(58) Field of Classification Search
CPC ........ H01M 4/505; H01M 4/525; H01M 4/02; H01M 2004/028; C01G 53/44;
(Continued)

(56) References Cited

U.S. PATENT DOCUMENTS

2011/0305954 A1   12/2011   Kim et al.
2014/0186710 A1*   7/2014   Ryoshi ................... C01G 53/82
429/223
(Continued)

FOREIGN PATENT DOCUMENTS

CN   108269995 A   7/2018
CN   108701827 A   10/2018
(Continued)

OTHER PUBLICATIONS

Han, Y. et al. Hierarchically assembled LiNi0.8Co0.1Mn0.1O2 secondary particles with high exposure of {010} plane synthesized via co-precipitation method. Electrochimica Acta, 329, 135057. Available online Oct. 17, 2019. (Year: 2019).*

(Continued)

*Primary Examiner* — Marla D Mcconnell
*Assistant Examiner* — Julia S Caserto
(74) *Attorney, Agent, or Firm* — Lerner David LLP

(57) ABSTRACT

A positive electrode active material precursor, a method of preparing the same, and a positive electrode active material, a positive electrode, and a lithium secondary battery pre-
(Continued)

pared from the same. In some embodiments, a positive electrode active material precursor includes nickel, cobalt, and manganese, wherein the positive electrode active material precursor satisfies: Equation 1 ($2.5 \leq C_{(100)}/C_{(001)} \leq 5.0$) and Equation 2 ($1.0 \leq C_{(101)}/C_{(001)} \leq 3.0$), where $C_{(001)}$ is a crystalline size in a (001) plane, $C_{(100)}$ is a crystalline size in a (100) plane, and $C_{(101)}$ is a crystalline size in a (101) plane. The positive electrode active material precursor has particle growth of a (001) plane that is suppressed.

14 Claims, 1 Drawing Sheet

(51) Int. Cl.
| | |
|---|---|
| *H01M 4/02* | (2006.01) |
| *H01M 4/505* | (2010.01) |
| *H01M 10/0525* | (2010.01) |

(52) U.S. Cl.
CPC ...... *C01P 2002/50* (2013.01); *C01P 2002/60* (2013.01); *C01P 2002/72* (2013.01); *C01P 2006/40* (2013.01); *H01M 2004/028* (2013.01); *H01M 10/0525* (2013.01)

(58) Field of Classification Search
CPC .. C01G 53/50; C01P 2002/50; C01P 2002/60; C01P 2002/70; C01P 2002/72
See application file for complete search history.

(56) References Cited

U.S. PATENT DOCUMENTS

| | | |
|---|---|---|
| 2015/0010821 A1 | 1/2015 | Makimura et al. |
| 2016/0056458 A1 | 2/2016 | Tamura et al. |
| 2016/0172674 A1 | 6/2016 | Oda et al. |
| 2016/0293950 A1 | 10/2016 | Kamata et al. |
| 2018/0048015 A1 | 2/2018 | Lee et al. |
| 2019/0020022 A1 | 1/2019 | Jeong et al. |
| 2019/0248673 A1 | 8/2019 | Kaneda et al. |
| 2019/0393502 A1 | 12/2019 | Yun et al. |
| 2020/0044248 A1 | 2/2020 | Tamura et al. |
| 2020/0373573 A1 | 11/2020 | Kim et al. |
| 2021/0098787 A1 | 4/2021 | Noh et al. |
| 2022/0041465 A1 | 2/2022 | Kaneda et al. |
| 2022/0093919 A1 | 3/2022 | Oda et al. |
| 2023/0253559 A1 | 8/2023 | Kaneda et al. |

FOREIGN PATENT DOCUMENTS

| | | | |
|---|---|---|---|
| CN | 110422889 A | | 11/2019 |
| EP | 3425706 A1 | | 1/2019 |
| JP | 2000243394 A | | 9/2000 |
| JP | 2001167761 A | | 6/2001 |
| JP | 2012004097 A | | 1/2012 |
| JP | 2013134822 A | | 7/2013 |
| JP | 5354112 B2 | | 11/2013 |
| JP | 2013246983 A | | 12/2013 |
| JP | 2015003838 A | | 1/2015 |
| JP | 2015026454 A | | 2/2015 |
| JP | 2015076154 A | | 4/2015 |
| JP | 2016044120 A | | 4/2016 |
| JP | 2018536972 A | | 12/2018 |
| JP | 2019021424 A | | 2/2019 |
| JP | 2019153567 A | | 9/2019 |
| JP | 2020035693 A | | 3/2020 |
| KR | 20140064680 A | | 5/2014 |
| KR | 20150078672 A | | 7/2015 |
| KR | 20170038485 A | | 4/2017 |
| KR | 20180063862 A | | 6/2018 |
| KR | 20190046678 A | | 5/2019 |
| KR | 20190068474 A | | 6/2019 |
| KR | 20190112710 A | | 10/2019 |
| KR | 20190113607 A | * | 10/2019 |
| KR | 20200001082 A | | 1/2020 |
| WO | 2016204563 A1 | | 12/2016 |
| WO | 2017150949 A1 | | 9/2017 |
| WO | 2018021555 A1 | | 2/2018 |
| WO | 2018143783 A1 | | 8/2018 |

OTHER PUBLICATIONS

Lv, B. et al. Fast production of B—Ni(OH)2 nanostructures with (001) and (100) plane exposure and their electrochemical properties. Journal of Materials Chemistry A. 1, 5695 (Year: 2013).*

Tan, X. "Synthesis and Modification of High-Voltage Ternary Positive Electrode Materials for Lithium-Ion Batteries," Metallurgical Industry Press, Mar. 2019, pp. 32-33.

Extended European Search Report including Written Opinion for Application No. 21770815.5 dated Dec. 1, 2022, pp. 1-8.

International Search Report for Application No. PCT/KR2021/003526 mailed Jul. 1, 2021, 2 pages.

Search Report dated Sep. 14, 2023 from the Office Action for Chinese Application No. 202180006530.5 issued Sep. 18, 2023, pp. 1-3. [See pp. 1-2, categorizing the cited references].

* cited by examiner

[FIG. 1A]  [FIG. 1B]  [FIG. 1C]  [FIG. 1D]
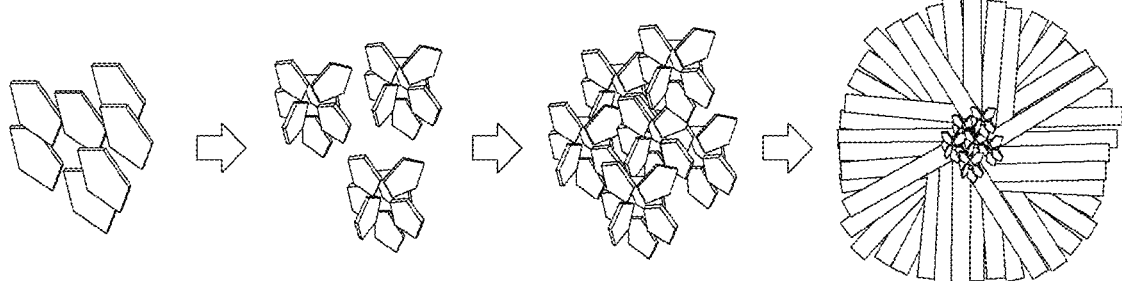
[FIG. 2]
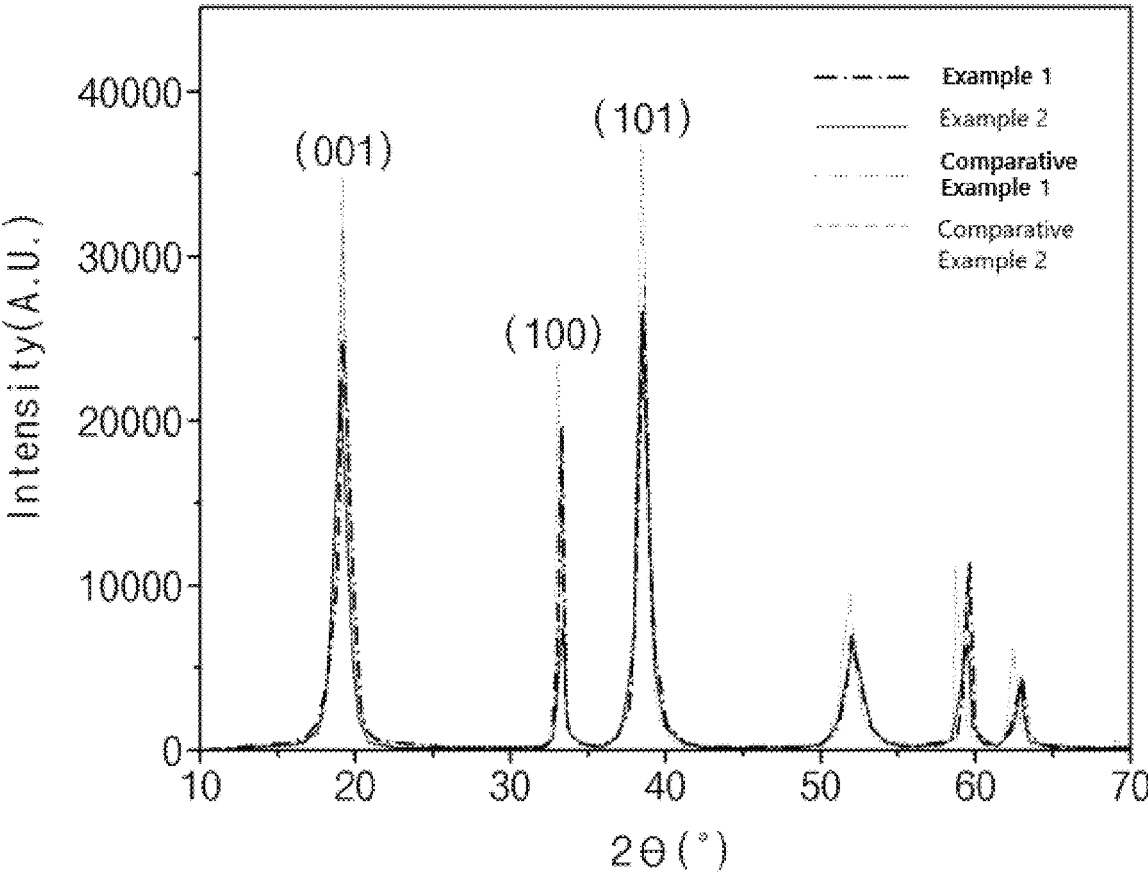

METHOD OF PREPARING POSITIVE ELECTRODE ACTIVE MATERIAL PRECURSOR FOR LITHIUM SECONDARY BATTERY, POSITIVE ELECTRODE ACTIVE MATERIAL PRECURSOR, AND POSITIVE ELECTRODE ACTIVE MATERIAL, POSITIVE ELECTRODE, AND LITHIUM SECONDARY BATTERY WHICH ARE PREPARED BY USING THE PRECURSOR

CROSS-REFERENCE TO RELATED APPLICATIONS

This application is a national phase entry under 35 U.S.C. § 371 of International Application No. PCT/KR2021/003526, filed on Mar. 22, 2021, which claims priority from Korean Patent Application No. 10-2020-0034381, filed on Mar. 20, 2020, the disclosures of which are incorporated by reference herein.

TECHNICAL FIELD

The present invention relates to a method of preparing a positive electrode active material precursor for a lithium secondary battery, a positive electrode active material precursor prepared by the above method, and a positive electrode active material, a positive electrode, and a lithium secondary battery which are prepared by using the positive electrode active material precursor.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

Lithium transition metal composite oxides have been used as a positive electrode active material of the lithium secondary battery, and, among these oxides, a lithium cobalt composite metal oxide, such as $LiCoO_2$, having a high operating voltage and excellent capacity characteristics has been mainly used. However, the $LiCoO_2$ has poor thermal properties due to an unstable crystal structure caused by delithiation. Also, since the $LiCoO_2$ is expensive, there is a limitation in using a large amount of the $LiCoO_2$ as a power source for applications such as electric vehicles.

Lithium manganese composite metal oxides ($LiMnO_2$ or $LiMn_2O_4$), lithium iron phosphate compounds ($LiFePO_4$, etc.), or lithium nickel composite metal oxides ($LiNiO_2$, etc.) have been developed as materials for replacing the $LiCoO_2$. Among these materials, research and development of the lithium nickel composite metal oxides, in which a large capacity battery may be easily achieved due to a high reversible capacity of about 200 mAh/g, have been more actively conducted. However, the $LiNiO_2$ has limitations in that the $LiNiO_2$ has poorer thermal stability than the $LiCoO_2$ and, when an internal short circuit occurs in a charged state due to an external pressure, the positive electrode active material itself is decomposed to cause rupture and ignition of the battery. Accordingly, as a method to improve low thermal stability while maintaining the excellent reversible capacity of the $LiNiO_2$, a lithium transition metal oxide, in which a portion of nickel (Ni) is substituted with cobalt (Co), manganese (Mn), or aluminum (Al), has been developed.

In order to prepare a positive electrode active material having targeted electrochemical performance, it is important to accurately identify crystallographic characteristics of a precursor for preparing the positive electrode active material.

Thus, there is a need to develop a method of controlling crystallographic characteristics of positive electrode active material precursor particles.

DISCLOSURE OF THE INVENTION

Technical Problem

An aspect of the present invention provides a method of preparing a positive electrode active material precursor which may suppress growth of a (001) plane.

Another aspect of the present invention provides a positive electrode active material precursor in which the growth of the (001) plane is suppressed by being prepared by the above-described preparation method.

Another aspect of the present invention provides a positive electrode active material in which growth of a (003) plane is minimized.

Another aspect of the present invention provides a positive electrode for a lithium secondary battery which includes the positive electrode active material.

Another aspect of the present invention provides a lithium secondary battery including the positive electrode for a secondary battery.

Technical Solution

According to an aspect of the present invention, there is provided a method of preparing a positive electrode active material precursor which includes: a first step of preparing a transition metal aqueous solution including a nickel raw material, a cobalt raw material, and a manganese raw material; a second step of preparing a reaction mother liquor by adding an ammonium cationic complexing agent, a basic compound, and water to a reactor; a third step of forming a reaction solution by adding the transition metal aqueous solution, additional ammonium cationic complexing agent, and additional basic compound to the reactor, in which the reaction mother liquor has been accommodated, and co-precipitating the reaction solution to form a core of a positive electrode active material precursor particle; a fourth step of adjusting a pH of the reaction solution to be higher than a pH of the reaction solution of the third step to grow the positive electrode active material precursor particle; and a fifth step of stabilizing the positive electrode active material precursor particle.

According to another aspect of the present invention, there is provided a positive electrode active material precursor including nickel, cobalt, and manganese, wherein the positive electrode active material precursor satisfies Equation 1 and Equation 2.

$$2.5 \leq C_{(100)}/C_{(001)} \leq 5.0 \qquad \text{[Equation 1]}$$

$$1.0 \leq C_{(101)}/C_{(001)} \leq 3.0 \qquad \text{[Equation 2]}$$

In Equation 1 and Equation 2, $C_{(001)}$ is a crystalline size in a (001) plane, $C_{(100)}$ is a crystalline size in a (100) plane, and $C_{(101)}$ is a crystalline size in a (101) plane.

According to another aspect of the present invention, there is provided a positive electrode active material prepared by using the positive electrode active material precursor.

According to another aspect of the present invention, there is provided a positive electrode for a lithium secondary battery which includes the positive electrode active material.

According to another aspect of the present invention, there is provided a lithium secondary battery including the positive electrode.

Advantageous Effects

According to the present invention, since a stabilization step is included during preparation of a positive electrode active material precursor, a crystal orientation of the positive electrode active material precursor is controlled to minimize growth of a specific crystal plane, and thus, electrochemical properties may be improved when the positive electrode active material precursor is applied to a battery.

BRIEF DESCRIPTION OF THE DRAWINGS

FIGS. 1A to 1D are a schematic view illustrating a change in shape of a positive electrode active material precursor particle according to preparation steps of a positive electrode active material precursor; and FIG. 2 illustrates X-ray diffraction (XRD) patterns of positive electrode active material precursors prepared in Examples 1 and 2 and Comparative Examples 1 and 2.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

Method of Preparing Positive Electrode Active Material Precursor

The present inventors have found that growth of a positive electrode active material precursor to a specific crystal plane may be suppressed by adding a stabilization step during preparation of the positive electrode active material precursor, thereby leading to the completion of the present invention.

Specifically, a method of preparing a positive electrode active material precursor according to the present invention includes the steps of: (1) preparing a transition metal aqueous solution including a nickel raw material, a cobalt raw material, and a manganese raw material (first step), (2) preparing a reaction mother liquor by adding an ammonium cationic complexing agent, a basic compound, and water to a reactor (second step), (3) forming a reaction solution by adding the transition metal aqueous solution, additional ammonium cationic complexing agent, and additional basic compound to the reactor, in which the reaction mother liquor has been accommodated, and co-precipitating the reaction solution to form a core of a positive electrode active material precursor particle (third step), (4) adjusting a pH of the reaction solution to be higher than a pH of the reaction solution of the third step to grow the positive electrode active material precursor particle (fourth step), and (5) stabilizing the positive electrode active material precursor particle (fifth step).

Hereinafter, the method of preparing a positive electrode active material precursor according to the present invention will be described in more detail.

(1) Transition Metal Aqueous Solution Preparing Step

First, a transition metal aqueous solution including a nickel raw material, a cobalt raw material, and a manganese raw material is prepared (first step).

The nickel raw material may be $Ni(OH)_2$, $NiO$, $NiOOH$, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, a fatty acid nickel salt, or a nickel halide, and any one thereof or a mixture of two or more thereof may be used.

The cobalt raw material may be $Co(OH)_2$, $CoSO_4$, $CoOOH$, $Co(OCOCH_3)_2 \cdot 4H_2O$, $Co(NO_3)_2 \cdot 6H_2O$, or $CoSO_4 \cdot 7H_2O$, and any one thereof or a mixture of two or more thereof may be used.

The manganese raw material may be a manganese oxide such as $Mn_2O_3$, $MnO_2$, and $Mn_3O_4$; a manganese salt such as $MnCO_3$, $Mn(NO_3)_2$, $MnSO_4$, manganese acetate, manganese dicarboxylate, manganese citrate, and a fatty acid manganese salt; an oxyhydroxide, and manganese chloride, and any one thereof or a mixture of two or more thereof may be used.

Also, the transition metal aqueous solution may further include a doping element ($M^1$) in addition to the nickel, manganese, and cobalt. In this case, $M^1$ may include at least one selected from the group consisting of tungsten (W), molybdenum (Mo), chromium (Cr), zirconium (Zr), titanium (Ti), magnesium (Mg), tantalum (Ta), and niobium (Nb). In a case in which the transition metal aqueous solution further includes the doping element, an effect of improving life characteristics, discharge characteristics, and/or stability may be achieved.

In the case that the transition metal aqueous solution further includes the doping element $M^1$, a doping element $M^1$-containing raw material may be selectively further added during the preparation of the transition metal aqueous solution.

At least one selected from the group consisting of an acetic acid salt, sulfate, sulfide, hydroxide, oxide, or oxyhydroxide containing the doping element $M^1$ may be used as the doping element $M^1$-containing raw material.

For example, the transition metal aqueous solution according to the present invention may include the nickel raw material such that an amount of nickel is 60 mol % or more, for example, 80 mol % or more based on a total number of moles of transition metals. In a case in which the amount of the nickel in the transition metal aqueous solution satisfies the above range, capacity characteristics may be further improved.

(2) Reaction Mother Liquor Preparing Step

Next, a reaction mother liquor is prepared by adding an ammonium cationic complexing agent, a basic compound, and water to a reactor (second step).

In this case, the reactor may be a reactor equipped with a filtration device, for example, a continuous filtered tank reactor (CFTR). In a case in which the continuous filtered tank reactor is used, since a large amount of the positive electrode active material precursor may be prepared in the same-sized reactor for the same time, it is advantageous in terms of productivity in comparison to a batch type reactor, and it is more advantageous in terms of quality characteristics in comparison to a continuous stirred tank reactor (CSTR) because it exhibits a uniform particle size distribution.

The ammonium cationic complexing agent may be at least one selected from the group consisting of $NH_4OH$, $(NH_4)_2SO_4$, $NH_4NO_3$, $NH_4Cl$, $CH_3COONH_4$, and $(NH_4)_2CO_3$, and may be added into the reactor in the form of a solution in which the above compound is dissolved in a solvent. In this case, water or a mixture of water and an organic solvent (specifically, alcohol etc.), which may be uniformly mixed with the water, may be used as the solvent.

Next, the basic compound may be at least one selected from the group consisting of NaOH, KOH, and $Ca(OH)_2$, and may be added into the reactor in the form of a solution in which the above compound is dissolved in a solvent. In this case, water or a mixture of water and an organic solvent (specifically, alcohol etc.), which may be uniformly mixed with the water, may be used as the solvent.

In the present invention, it is desirable that a pH of the reaction mother liquor is in a range of 11.7 to 11.9. Conventionally, it was common to form a reaction mother liquor so that a pH of the reaction mother liquor became 12 or more when preparing a nickel-cobalt-manganese-based positive electrode active material precursor. However, according to the research of the present inventors, in a case in which the pH of the reaction mother liquor was adjusted in a range of 11.7 to 11.9 and the precursor was formed, it was found that growth of a (001) plane of the positive electrode active material precursor was suppressed.

It is desirable that the reaction mother liquor includes the basic compound in a concentration of 0.01 mol/L or less, for example, 0.001 mol/L to 0.01 mol/L, and includes the ammonium cationic complexing agent in a concentration of 0.3 mol/L to 0.6 mol/L. When the concentrations of the basic compound and the ammonium cationic complexing agent in the reaction mother liquor satisfy the above ranges, the pH of the reaction mother liquor may be adjusted to a desired range, and a precursor with a minimized crystal size of the (001) plane may be prepared by minimizing surface energy of primary particles formed in a core forming step to be described later.

(3) Step of Forming Core of Positive Electrode Active Material Precursor Particle Next, a reaction solution is formed by adding the transition metal aqueous solution, an ammonium cationic complexing agent, and a basic compound to the reactor, in which the reaction mother liquor has been accommodated, and the reaction solution is co-precipitated to form a core of a positive electrode active material precursor particle (third step).

A process of forming a positive electrode active material precursor particle according to the present invention is illustrated in FIGS. 1A to 1D.

When the co-precipitation reaction is started while the transition metal aqueous solution, ammonium cationic complexing agent and basic compound are added to the reactor containing the reaction mother liquor, nuclei of a positive electrode active material precursor particle in the form of primary particles are formed (nucleation) as illustrated in FIG. 1A. As the co-precipitation reaction proceeds, seeds in the form of a secondary particle are formed as illustrated in FIG. 1B while the nuclei in the form of primary particles are aggregated, and the seeds in the form of a secondary particle are aggregated to form a core of the precursor particle as illustrated in FIG. 1C. Thereafter, particle growth is performed on the core through a fourth step to be described later, and, as a result, the precursor particle is prepared as illustrated in FIG. 1D.

The transition metal aqueous solution used in this third step is the transition metal aqueous solution prepared in the above-described first step, and the ammonium cationic complexing agent and the basic compound are the same as the ammonium cationic complexing agent and the basic compound used in the second step.

In the core forming step, it is desirable that a pH of the reaction solution is maintained at a range of 10.5 to 11.2. In a case in which the pH of the reaction solution satisfies the above range, the nuclei of the positive electrode active material precursor are formed in the reaction solution, a series of processes in which the nuclei are aggregated to form the core may be smoothly performed, and a positive electrode active material precursor particle, in which growth of a (001) plane is suppressed, may be prepared. In a case in which the pH is outside the above range, since the core of the precursor particle may not be sufficiently formed and the growth of the particle may be slowed, it may be difficult to reach a desired final product particle size. Also, it is not effective in terms of suppressing the growth of the (001) plane of the positive electrode active material precursor particle.

According to the research of the present inventors, it is possible to control a crystal plane of the positive electrode active material precursor to grow in a specific direction or suppress the growth by controlling concentrations and input amounts of the materials in the initial reaction solution, reaction temperature, and/or mixing speed. For example, an environment, in which the (001) crystal plane has thermodynamically high surface energy, may be created by appropriately controlling addition rates of the transition metal aqueous solution, the basic compound, and/or the ammonium cationic complexing agent added to the initial reaction solution, and thus, a positive electrode active material precursor particle core, in which the growth of the (001) crystal plane is suppressed, may be formed.

Specifically, in the third step of forming the core of the positive electrode active material precursor particle, a ratio of a molar concentration of the ammonium cationic complexing agent added per unit time to a molar concentration of the transition metal aqueous solution added per unit time (that is, the molar concentration of the metal aqueous solution added per unit time/the molar concentration of the ammonium cationic complexing agent added per unit time) may be 0.2 or more, for example, 0.25 to 0.4.

In a case in which the ratio of the amounts of the metal aqueous solution and ammonium cationic complexing agent added in the third step satisfies the above-described range, since a state that minimizes strain energy is created by matching a lattice constant of a seed crystal and a lattice constant of a newly formed crystal, a precursor, in which the growth of the (001) crystal plane is minimized, may be formed.

(4) Positive Electrode Active Material Precursor Particle Growing Step

Next, when the precursor core particles are formed through the above-described process, the pH of the reaction solution is adjusted to be higher than the pH of the third step to grow the precursor particle (fourth step).

In the fourth step, the pH of the reaction solution, for example, may be controlled to be maintained at greater than 11.2 and equal to or less than 13, for example, 11.3 to 11.4. If the pH of the reaction solution is increased as described above, the formation of new particles is suppressed, and particle growth, in which crystal growth and particle aggregation occur on a surface of the pre-formed particle, occurs preferentially to increase a particle size.

The pH adjustment, for example, may be performed by a method of adjusting the amount of the basic compound added.

(5) Stabilizing Step

When the precursor particle grows to a desired size through the fourth step, a stabilization step of stabilizing the precursor particle is performed (fifth step).

The stabilization step is for providing a crystal orientation of the precursor particle, wherein, since the particle aggregation is suppressed in the stabilization step, the growth of the precursor particle is insignificant, but the crystal growth is made along an already grown crystal plane to provide a preferred orientation of a specific crystal plane, and, as a result, crystal growth on a plane other than the (001) plane may be promoted to minimize the growth of the (001) plane.

Specifically, the stabilization step is a section in which an average particle diameter ($D_{50}$) growth rate of the precursor particle is 0.10 μm/hr or less.

It is desirable that the stabilization step is performed for 10% or more, for example, 10% to 25% of a total reaction time of the third step and the fourth step. When the stabilization time satisfies the above range, a positive electrode active material precursor, in which the growth of the (001) plane is effectively suppressed, may be obtained while being economically favorable.

The third to fifth steps of the present invention may be performed in a reactor equipped with a filtration device in the reactor, for example, a continuous filtered tank reactor (CFTR).

In a case in which the positive electrode active material precursor is prepared by using the reactor equipped with a filtration device as described above, since the reaction may be performed while continuously discharging a filtrate except for a solid content (i.e., precursor particles) in the reaction solution to the outside of the reactor through the filtration device when the reaction solution in the reactor is full, raw materials may be continuously supplied. Accordingly, better productivity may be obtained than a case where a batch type reactor with the same volume is used. Also, in the case that the reaction is preformed using the reactor equipped with a filtration device, since the reaction proceeds while the reaction solution continuously stays in the reactor different from a continuous stirred tank reactor (CSTR), quality uniformity of the precursor particle is excellent.

Positive Electrode Active Material Precursor

Next, a positive electrode active material precursor according to the present invention will be described.

The positive electrode active material precursor according to the present invention may be prepared by the above-described preparation method of the present invention, and is a positive electrode active material precursor including nickel, cobalt, and manganese, wherein it has a crystalline size satisfying Equation 1 and Equation 2 below.

$$2.5 \leq C_{(100)}/C_{(001)} \leq 5.0 \qquad \text{[Equation 1]}$$

$$1.0 \leq C_{(101)}/C_{(001)} \leq 3.0 \qquad \text{[Equation 2]}$$

In Equation 1 and Equation 2, Coon is a crystalline size in a (001) plane, $C_{(100)}$ is a crystalline size in a (100) plane, and $C_{(101)}$ is a crystalline size in a (101) plane.

With respect to the positive electrode active material precursor prepared according to the method of the present invention, since the growth of the (001) crystal plane is suppressed, the crystalline sizes in the (100) and (101) planes are predominantly formed, and, as a result, the above-described Equations 1 and 2 are satisfied.

Specifically, the positive electrode active material precursor of the present invention has a crystalline size in the (001) plane of 150 Å or less, preferably 100 Å or less, and more preferably 50 Å to 100 Å.

The (001) crystal plane of the positive electrode active material precursor corresponds to a (003) crystal plane of a positive electrode active material prepared by using the positive electrode active material precursor, wherein, since the (003) crystal plane of the positive electrode active material is thermodynamically stable and has electrochemically inert characteristics, it does not act as a movement path of lithium ions. With respect to the positive electrode active material prepared by using the positive electrode active material precursor having a small crystalline size in the (001) crystal plane as in the present invention, since growth of the (003) crystal plane is suppressed and an area of other crystal planes, as lithium movement paths, is increased, lithium ion mobility is improved, and thus, capacity and resistance characteristics are further improved due to the improvement of the lithium ion mobility when the positive electrode active material is used in a battery.

The positive electrode active material precursor according to the present invention may be a nickel-cobalt-manganese hydroxide, a nickel-cobalt-manganese oxyhydroxide, or a mixture thereof, and a molar ratio of nickel in total transition metals in the hydroxide or oxyhydroxide may be 60 mol % or more, for example, 80 mol % or more. In a case in which a nickel content in the precursor satisfies the above range, excellent capacity characteristics may be achieved.

Method of Preparing Positive Electrode Active Material

The above-prepared positive electrode active material precursor, in which the growth of the (001) crystal plane is suppressed, and a lithium raw material are mixed and sintered to prepare a positive electrode active material.

The lithium raw material may be used without particular limitation as long as it is a compound including a lithium source, but, preferably, at least one selected from the group consisting of lithium carbonate ($Li_2CO_3$), lithium hydroxide ($LiOH—H_2O$), $LiNO_3$, $CH_3COOLi$, and $Li_2(COO)_2$ may be used.

For example, transition metal elements included in the precursor and the lithium raw material may be mixed in amounts such that a molar ratio of transition metals (Me): lithium (Li) is in a range of 1:1 to 1:1.3. In a case in which the lithium raw material is mixed in a ratio less than the above range, capacity of the prepared positive electrode active material may be reduced, and, in a case in which the lithium raw material is mixed in a ratio greater than the above range, since particles are sintered during a sintering process, the preparation of the positive electrode active material may be difficult, the capacity may be reduced, and separation of the positive electrode active material particles may occur after the sintering.

The sintering may be performed in a temperature range of 730° C. to 800° C. for 10 hours to 15 hours, for example, 750° C. to 780° C. for 12 hours to 14 hours. With respect to the positive electrode active material precursor of the present application, since the path through which lithium ions may move is exposed to the outside as much as possible as the growth of the (001) plane is suppressed, diffusion of the lithium ions is easy, and thus, the sintering may be performed at a lower temperature and for a shorter time than sintering temperature and time during preparation of a conventional positive electrode active material.

Positive Electrode Active Material

Also, the present invention provides a positive electrode active material which is prepared by using the above-described positive electrode active material precursor.

Specifically, since the positive electrode active material according to the present invention is prepared by using the positive electrode active material precursor in which the growth of the (001) crystal plane is suppressed, it may be a lithium nickel cobalt manganese-based oxide in which the growth of the (003) crystal plane, which may not be a movement path of lithium ions, is suppressed.

More specifically, the positive electrode active material of the present invention may be a lithium nickel cobalt manganese-based oxide represented by Formula 1 below.

$$Li_{1+a}Ni_xCo_yMn_zM^1_wO_2 \qquad \text{[Formula 1]}$$

In Formula 1, $M^1$ may be at least one selected from the group consisting of tungsten (W), molybdenum (Mo), chromium (Cr), zirconium (Zr), titanium (Ti), magnesium (Mg), tantalum (Ta), and niobium (Nb).

1+a represents a molar ratio of lithium in the lithium transition metal oxide, wherein a may satisfy $0 \le a \le 0.3$, for example, $0 \le a \le 0.2$.

x represents a molar ratio of nickel in total transition metals, wherein x may satisfy $0.60 \le x < 1.0$, $0.70 \le x \le 0.99$, or $0.80 \le x \le 0.99$. In a case in which the nickel content satisfies the above range, excellent capacity characteristics may be achieved.

y represents a molar ratio of cobalt in the total transition metals, wherein y may satisfy $0 < y < 0.40$, $0 < y < 0.30$, or $0.01 \le y \le 0.20$.

z represents a molar ratio of manganese in the total transition metals, wherein z may satisfy $0 < z < 0.40$, $0 < z < 0.30$, or $0.01 < z < 0.20$.

w represents a molar ratio of $M^1$ in the total transition metals, wherein w may satisfy $0 \le w \le 0.1$ or $0 \le w \le 0.05$.

Since an area of the (003) crystal plane, which may not be the movement path of lithium ions, is minimized in the positive electrode active material of the present invention, the lithium ion mobility is excellent. Thus, excellent capacity characteristics and resistance characteristics may be achieved when the positive electrode active material of the present invention is used in the battery.

Positive Electrode

Also, the present invention provides a positive electrode for a lithium secondary battery which includes the positive electrode active material prepared by the above-described method.

Specifically, the positive electrode includes a positive electrode collector and a positive electrode active material layer which is disposed on at least one surface of the positive electrode collector and includes the above-described positive electrode active material.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode active material layer may include a conductive agent and a binder in addition to the positive electrode active material.

In this case, the positive electrode active material may be included in an amount of 80 wt % to 99 wt %, for example, 85 wt % to 98 wt % based on a total weight of the positive electrode active material layer. When the positive electrode active material is included in an amount within the above range, excellent capacity characteristics may be obtained.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on the total weight of the positive electrode active material layer.

The binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. For example, a positive electrode material mixture, which is prepared by dissolving or dispersing the above-described positive electrode active material as well as selectively the binder and the conductive agent in a solvent, is coated on the positive electrode collector, and the positive electrode may then be prepared by drying and rolling the coated positive electrode collector, or the positive electrode may be prepared by casting the positive electrode material mixture on a separate support and then laminating a film separated from the support on the positive electrode collector. In this case, types and amounts of the positive electrode active material, the binder, and the conductive are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of a slurry and manufacturing yield, and may allow to have a viscosity that may provide excellent thickness uniformity during the subsequent coating for the preparation of the positive electrode.

Lithium Secondary Battery

Furthermore, in the present invention, an electrochemical device including the positive electrode may be prepared. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein, since the positive electrode is the same as described above, detailed descriptions thereof will be omitted, and the remaining configurations will be only described in detail below.

Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ ($0<\beta<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The negative electrode active material may be included in an amount of 80 wt % to 99 wt % based on a total weight of the negative electrode active material layer.

The binder is a component that assists in the binding between the conductive agent, the active material, and the current collector, wherein the binder is typically added in an amount of 0.1 wt % to 10 wt % based on the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a fluoro rubber, and various copolymers thereof.

The conductive agent is a component for further improving conductivity of the negative electrode active material, wherein the conductive agent may be added in an amount of 10 wt % or less, for example, 5 wt % or less based on the total weight of the negative electrode active material layer. The conductive agent is not particularly limited as long as it has conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers or metal fibers; fluorocarbon; metal powder such as aluminum powder, and nickel powder; conductive whiskers such as zinc oxide whiskers and potassium titanate whiskers; conductive metal oxide such as titanium oxide; or polyphenylene derivatives may be used.

The negative electrode may be prepared by coating a negative electrode material mixture, which is prepared by dissolving or dispersing selectively the binder and the conductive agent as well as the negative electrode active material in a solvent, on the negative electrode collector and drying the coated negative electrode collector, or may be prepared by casting the negative electrode material mixture on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve life characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 part by weight to 5 parts by weight based on 100 parts by weight of a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

Example 1

$NiSO_4$, $CoSO_4$, and $MnSO_4$ were mixed in water in amounts such that a molar ratio of nickel:cobalt:manganese was 88:5:7 to prepare a transition metal aqueous solution (first step).

A container containing the transition metal aqueous solution, an additional NaOH solution, and a $NH_4OH$ aqueous solution were respectively connected to a 350 L continuous filtered tank reactor (CFTR) equipped with a filtration device (filter).

Subsequently, after 86 L of deionized water was put into the reactor, dissolved oxygen in the water was removed by purging the reactor with nitrogen gas at a rate of 20 L/min to create a non-oxidizing atmosphere in the reactor. Thereafter, after a NaOH aqueous solution and a $NH_4OH$ aqueous solution were added, a reaction mother liquor with a pH of 11.7 to 11.9 was prepared while the mixture was stirred at a stirring speed of 700 rpm (second step).

Thereafter, the transition metal aqueous solution, a $NH_4OH$ aqueous solution, and a NaOH aqueous solution were added to the reactor to induce formation of nickel cobalt manganese hydroxide particles and particle aggregation to form a precursor core (third step). In this case, the transition metal aqueous solution and the $NH_4OH$ aqueous solution were added so that a ratio of a molar concentration of the $NH_4OH$ aqueous solution to a molar concentration of the transition metal aqueous solution added per unit time was 0.3, and an amount of the NaOH aqueous solution added was adjusted so that a pH of a reaction solution may be maintained at 10.5 to 11.2.

Subsequently, the reaction proceeded while adjusting the amount of the NaOH aqueous solution added so that the pH of the reaction solution was 11.3 to 11.5 to grow nickel cobalt manganese hydroxide particles (fourth step).

A total reaction time of the precursor core forming step (third step) and the particle growth reaction step (fourth step) was 40 hours.

Then, the nickel cobalt manganese hydroxide particles after the completion of the growth were further reacted for 8 hours to be stabilized (fifth step).

The reaction was performed while continuously discharging a filtrate through the filtration device in the reactor when the reactor was full. Next, nickel cobalt manganese hydroxide particles formed through the above process were separated, washed, and then dried to prepare a precursor in which $Ni_{0.88}Co_{0.05}Mn_{0.07}(OH)_2$ and $Ni_{0.88}Co_{0.05}Mn_{0.07}OOH$ phases were mixed.

Example 2

A positive electrode active material precursor was prepared in the same manner as in Example 1 except that the precursor core forming step (third step) and the particle growth reaction step (fourth step) were performed for a total of 53 hours and the stabilization reaction (fifth step) was performed for 15 hours.

Comparative Example 1

$NiSO_4$, $CoSO_4$, and $MnSO_4$ were mixed in water in amounts such that a molar ratio of nickel:cobalt:manganese was 88:5:7 to prepare a transition metal aqueous solution.

Next, after 86 L of deionized water was put into a continuous filtered tank reactor (CFTR) equipped with a filtration device (filter), dissolved oxygen in the water was removed by purging the reactor with nitrogen gas at a rate of 20 L/min to create a non-oxidizing atmosphere in the reactor. Thereafter, after a NaOH aqueous solution and a $NH_4OH$ aqueous solution were added, a reaction mother liquor with a pH of 12.1 was prepared while the mixture was stirred at a stirring speed of 700 rpm.

The transition metal aqueous solution, a $NH_4OH$ aqueous solution, and a NaOH aqueous solution were added to the reactor to induce formation of nickel cobalt manganese hydroxide particles and particle aggregation to form a precursor core. In this case, the transition metal aqueous solution and the $NH_4OH$ aqueous solution were added so that a ratio of a molar concentration of the $NH_4OH$ aqueous solution to a molar concentration of the transition metal aqueous solution added per unit time was 0.5, and an amount of the NaOH aqueous solution added was adjusted so that a pH of a reaction solution may be maintained at 11.7 to 11.9.

Subsequently, the reaction proceeded while adjusting the amount of the NaOH aqueous solution added so that the pH was 12 to grow nickel cobalt manganese hydroxide particles.

A total reaction time of the precursor core forming step and the particle growth reaction step was 48 hours.

The reaction was performed while continuously discharging a filtrate through the filtration device in the reactor when the reactor was full.

Then, nickel cobalt manganese hydroxide particles formed through the above process were separated, washed, and then dried to prepare a precursor in which $Ni_{0.88}Co_{0.05}Mn_{0.07}(OH)_2$ and $Ni_{0.88}Co_{0.05}Mn_{0.07}OOH$ phases were mixed.

Comparative Example 2

A positive electrode active material precursor was prepared in the same manner as in Example 1 except that the stabilization step of the nickel cobalt manganese hydroxide particles after the completion of the growth was not performed.

Experimental Example 1: Particle Characterization (1) Precursor Crystalline Size Crystalline sizes of the positive electrode active material precursor particles prepared in Examples 1 and 2 and Comparative Examples 1 to 2 were measured through the following method.

X-ray diffraction (XRD) patterns of the precursors prepared in Examples 1 and 2 and Comparative Examples 1 and 2 were measured using an X-ray diffraction analyzer (Rigaku Corporation). The XRD patterns of the positive electrode active material precursor particles prepared in Examples 1 and 2 and Comparative Examples 1 and 2 are illustrated in FIG. 2.

After a half-value width of a peak for each crystal plane was obtained from the measured XRD pattern, a crystalline size in each crystal plane of the precursor was calculated using the Scherrer equation through ellipsoid modeling.

Measurement results are presented in Table 1 below.

TABLE 1

| Category | Crystal plane | Example 1 | Example 2 | Comparative Example 1 | Comparative Example 2 |
|---|---|---|---|---|---|
| Crystal size (Å) | (001) | 98 | 84 | 181 | 115 |
| | (100) | 346 | 302 | 345 | 285 |
| | (101) | 128 | 115 | 157 | 123 |
| Crystal size ratio | (100)/(001) | 3.531 | 3.595 | 1.906 | 2.478 |
| | (101)/(001) | 2.703 | 2.626 | 2.127 | 2.317 |

As illustrated in Table 1, with respect to the positive electrode active material precursors prepared in Examples 1 and 2, it may be confirmed that the growth of the (001) crystal plane was suppressed in comparison to the positive electrode active material precursors prepared in Comparative Examples 1 and 2.

(2) Average Particle Diameter

In order to check particle size distributions of the positive electrode active material precursor particles prepared in Examples 1 and 2 and Comparative Examples 1 and 2, particle sizes of the positive electrode active material precursors formed in Examples 1 and 2 and Comparative Examples 1 and 2 were measured using a particle size distribution measurement instrument (Microtrac 53500, Microtrac), and the results thereof are presented in [Table 2] below.

(3) BET Specific Surface Area

Brunauer-Emmett-Teller (BET) specific surface areas of the positive electrode active material precursors prepared in Example 1 and Comparative Examples 1 and 2 were checked. The specific surface area of the positive electrode active material precursor was measured by a BET method, wherein, specifically, the specific surface area was calculated from a nitrogen gas adsorption amount at a liquid nitrogen temperature (77K) using BELSORP-mini II by Bell Japan Inc., and the results thereof are presented in Table 2 below.

(4) Tap Density

After filling a 200 cc container with 50 g of each of the positive electrode active material precursors obtained in Examples 1 and 2 and Comparative Examples 1 and 2, apparent density of particles, which was obtained by vibrating under constant conditions, was measured. Specifically, tap density of the lithium transition metal oxide particles was measured using a tap density tester (KYT-5000, Seishin Enterprise Co., LTD.). Measurement results are presented in Table 2 below.

TABLE 2

| | Average particle diameter (μm) | | | | | BET specific surface area | Tap density |
| | $D_{50}$ | $D_5$ | $D_{95}$ | $D_{min}$ | $D_{max}$ | $(m^2/g)$ | (g/cc) |
|---|---|---|---|---|---|---|---|
| Example 1 | 10.0 | 7.5 | 14.3 | 5.5 | 22.0 | 8.21 | 1.985 |
| Example 2 | 9.9 | 7.6 | 13.9 | 5.5 | 22.0 | — | 1.870 |
| Comparative Example 1 | 10.6 | 8.0 | 15.2 | 6.5 | 22.0 | 5.22 | 1.881 |
| Comparative Example 2 | 10.5 | 11.6 | 21.9 | 9.3 | 26.2 | 8.91 | 2.030 |

Experimental Example 2: Initial Efficiency

Lithium secondary batteries were prepared by using the positive electrode active material precursors of Examples 1 and 2 and Comparative Examples 1 and 2 which were prepared as in Experimental Example 1.

Specifically, each of the positive electrode active material precursors prepared in Examples 1 and 2 and Comparative Examples 1 and 2 and LiOH were mixed such that a molar ratio of lithium (Li):transition metals was 1.07:1, and sintered at 770° C. for 12 hours to prepare each positive electrode active material.

Each of the positive electrode active materials prepared as described above, a conductive agent, and a binder were mixed in a solvent to prepare a positive electrode slurry. One surface of an aluminum current collector was coated with the positive electrode slurry, dried, and then rolled to prepare a positive electrode.

Li metal was used as a negative electrode.

Each lithium secondary battery was prepared by preparing an electrode assembly by disposing a polyethylene separator between the above-prepared positive electrode and negative electrode, disposing the electrode assembly in a battery case, and then injecting an electrolyte solution into the case. In this case, as the electrolyte solution, an electrolyte solution, in which 1 M $LiPF_6$ was dissolved in an organic solvent in which ethylene carbonate (EC):ethyl methyl carbonate (EMC):diethyl carbonate (DEC) were mixed in a volume ratio of 3:4:3, was injected to prepare the lithium secondary batteries according to Examples 1 and 2 and Comparative Examples 1 and 2.

Subsequently, each of the lithium secondary batteries prepared in Examples 1 and 2 and Comparative Examples 1 and 2 was charged at a constant current of 0.1 C to 4.25 V at 25° C. Subsequently, each lithium secondary battery was discharged at a constant current of 0.1 C to 3.0 V, initial charge capacity, initial discharge capacity, and initial efficiency of the lithium secondary batteries according to Examples 1 and 2 and Comparative Examples 1 and 2 were confirmed, and the results thereof are presented in Table 3 below.

TABLE 3

| | Charge capacity (mAh/g) | Discharge capacity (mAh/g) | Efficiency (%) |
|---|---|---|---|
| Example 1 | 233.5 | 214.0 | 91.6 |
| Example 2 | 232.0 | 216.3 | 93.2 |
| Comparative Example 1 | 229.0 | 208.9 | 91.2 |
| Comparative Example 2 | 231.7 | 213.9 | 92.3 |

Experimental Example 3: Life Characteristics

The lithium secondary batteries respectively including the positive electrode active materials of Examples 1 and 2 and Comparative Examples 1 and 2, which were prepared by the same method as Experimental Example 2, were charged at a constant current of 0.1 C to 4.25 V at 45° C. Subsequently, each lithium secondary battery was discharged at a constant current of 0.1 C to 3.0 V. The above charging and discharging were set as one cycle, and, after this cycle was repeated 30 times, capacity retentions and resistance characteristics in a 30th cycle of the lithium secondary batteries of Examples 1 and 2 and Comparative Examples 1 and 2 were measured, and the results thereof are presented in the following Table 4.

TABLE 4

| | Capacity retention (%) | DCR (%) |
|---|---|---|
| Example 1 | 95.4 | 63.6 |
| Example 2 | 96.2 | 44.2 |
| Comparative Example 1 | 96.0 | 85.4 |
| Comparative Example 2 | 93.9 | 64.6 |

Referring to Table 3 and Table 4, with respect to the lithium secondary battery of Comparative Example 1, initial efficiency was reduced and resistance after 30 cycles was significantly increased in comparison to those of the lithium secondary batteries of Examples 1 and 2, and, with respect to the lithium secondary battery of Comparative Example 2, it may be confirmed that capacity retention after 30 cycles was significantly reduced in comparison to those of Examples 1 and 2. In contrast, the lithium secondary batteries of Examples 1 and 2 had both excellent initial efficiency and excellent life characteristics.

The invention claimed is:

1. A positive electrode active material precursor, comprising:
   nickel;
   cobalt; and
   manganese,
   wherein the positive electrode active material precursor satisfies Equation 1 and Equation 2:

$$2.5 \leq C_{(100)}/C_{(001)} \leq 5.0 \qquad \text{[Equation 1]}$$

$$1.0 \leq C_{(101)}/C_{(001)} \leq 3.0 \qquad \text{[Equation 2]}$$

wherein, in Equation 1 and Equation 2, $C_{(001)}$ is a crystalline size in a (001) plane, $C_{(100)}$ is a crystalline size in a (100) plane, and $C_{(101)}$ is a crystalline size in a (101) plane, wherein the $C_{(001)}$ is 100 Å or less, wherein the positive electrode active material precursor is a nickel-cobalt-manganese hydroxide, a nickel-cobalt-manganese oxyhydroxide, or a mixture thereof, and wherein the positive electrode active material precursor may further include a doping element.

2. The positive electrode active material precursor of claim 1, wherein the nickel-cobalt-manganese hydroxide or the nickel-cobalt-manganese oxyhydroxide include nickel in an amount of 60 mol % or more, based on a total number of moles of transition metals.

3. A positive electrode active material prepared by using the positive electrode active material precursor of claim 1.

4. A positive electrode for a lithium secondary battery, the positive electrode comprising the positive electrode active material of claim 3.

5. A lithium secondary battery comprising the positive electrode of claim 4.

6. A method of preparing the positive electrode active material precursor of claim 1, the method comprising:

(1) preparing a transition metal aqueous solution including a nickel raw material, a cobalt raw material, and a manganese raw material;

(2) adding an ammonium cationic complexing agent, a basic compound, and water to a reactor to prepare a reaction mother liquor;

(3) adding the transition metal aqueous solution, additional ammonium cationic complexing agent, and additional basic compound to the reaction mother liquor in the reactor to prepare a reaction solution, and co-precipitating the reaction solution to form a core of a positive electrode active material precursor particle;

(4) raising a pH of the reaction solution to grow the positive electrode active material precursor particle; and (5) stabilizing the positive electrode active material precursor particle.

7. The method of claim 1, wherein a pH of the reaction mother liquor in step (2) is in a range of 11.7 to 11.9.

8. The method of claim 1, wherein the pH of the reaction solution in step (3) is in a range of 10.5 to 11.2.

9. The method of claim 1, wherein the pH of the reaction solution in step (4) is greater than 11.2 and equal to or less than 11.5.

10. The method of claim 1, wherein, in step (3), a ratio of a molar concentration of the additional ammonium cationic complexing agent added per unit time to a molar concentration of the transition metal aqueous solution added per unit time is 0.2 or more.

11. The method of claim 1, wherein, in step (2), the reaction mother liquor comprises the basic compound in a concentration of 0.01 mol/L or less and comprises the ammonium cationic complexing agent in a concentration of 0.3 mol/L to 0.6 mol/L.

12. The method of claim 1, wherein the reactor comprises a filtration device.

13. The method of claim 1, wherein an average particle diameter growth rate of the positive electrode active material precursor particle in step (5) is 0.10 μm/hr or less.

14. The method of claim 1, wherein, in step (5), the stabilizing is performed for 10% or more of a sum of reaction times of step (3) and step (4).

* * * * *